July 4, 1967  R. J. RUSH ET AL  3,329,263
ROOT CROP HANDLING DEVICES
Filed Dec. 1, 1965  2 Sheets-Sheet 1

INVENTORS,
ROBERT J. RUSH
BILL H. RUSH
WILLARD J. HAHN
BY Watson, Cole, Grindle & Watson
ATTORNEYS

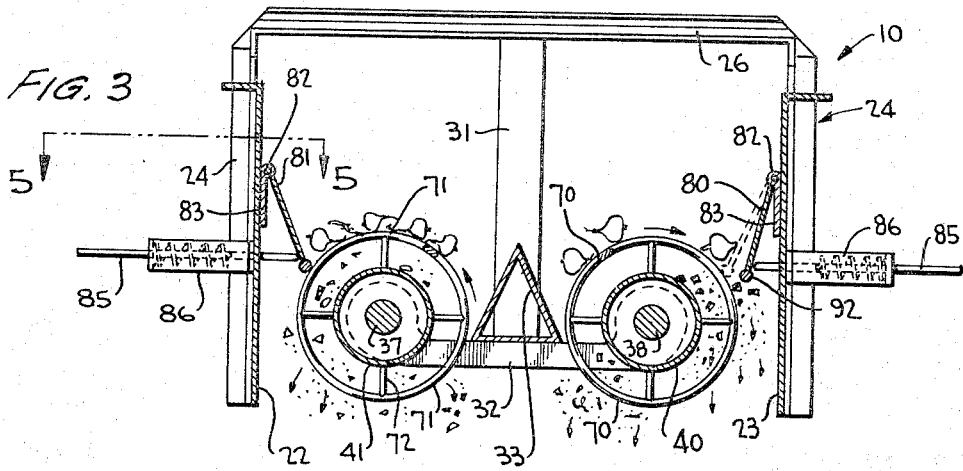

United States Patent Office 3,329,263
Patented July 4, 1967

3,329,263
ROOT CROP HANDLING DEVICES
Robert J. Rush and Bill H. Rush, both of Rte. 1, Billings, Mont. 59102, and Willard J. Hahn, Rte. 1, Laurel, Mont. 59044
Filed Dec. 1, 1965, Ser. No. 510,828
6 Claims. (Cl. 209—101)

This invention relates to root crop handling devices and more particularly to such devices as are adapted to separate or screen such crops from accompanying debris, such as rocks, stones, mud, clods, weeds, grass, etc. during or after harvesting.

The general object of the invention is the provision of a device for this purpose which is relatively simple in construction and easy and trouble-free in operation, and which insures the separation and discarding of rocks and other hard substances from the device without harm or damage to either the mechanism or the crop. The invention is readily applicable to all sorts of root crops such as beets, potatoes, carrots, turnips, onions, and the like.

Sugar beets, in particular, comprise a crop which is especially difficult to harvest, due to the fact that the beets are rather large and have a heavy massive root system which carries substantial amounts of earth in the form of lumps or clods, or adhering mud.

Also, it is necessary to harvest sugar beets at a particular time of year and whether the ground conditions are wet or dry. This means that the beets are especially dirty when the ground is muddy and accompanied by adhering clods when the ground is dry. Furthermore, in any case, the crop is usually accompanied by a certain amount of trash, including weeds and forage remaining from the tops of these root plants. All of this debris must be removed before marketing in order for the producer to receive the highest prices upon delivery of the processor.

In its preferred embodiment, the invention contemplates the provision of at least one roll or cylinder mounted for rotation adjacent a spring-loaded wall or baffle plate, and the cylinders are each provided with one or more helixes of rod material wrapped around the cylinders and spaced radially outwardly therefrom as by means of short posts. The yieldable baffle plates are mounted, preferably hingedly, alongside of the rolls, and the direction of winding of the spiral bar or rod and the direction of rotation of the rolls or cylinders themselves are such that the received material is moved in an overhand lateral direction toward the adjacent baffle plate as well as longitudinally of the rolls toward the delivery point for the beets.

In such novel arrangement the lighter of the larger components of the material, which of course is constituted by the crop itself, is "floated" along the roll by the elevated helical bar or rail toward the discharge end of the device without damage through undue abrasion or the pinching or squeezing off of the tail portions of the beets. At the same time, mud and clods are broken up and discharged through the spaces beneath the helical rods, any larger and harder pieces of clod or rock causing the baffle plates to yield against the spring pressure and permit the discharge of such larger pieces.

Other objects and features of novelty will be apparent from the following specification when read in connection with the accompanying drawings in which one embodiment of the invention is illustrated by way of example.

In the drawings:

FIGURE 3 is a view in transverse vertical section taken on line 3—3 of FIGURE 2;

FIGURE 4 is a similar view taken on line 4—4 of FIGURE 2; and

FIGURE 5 is a detail view on an enlarged scale taken on line 5—5 of FIGURE 2.

Figure 1:
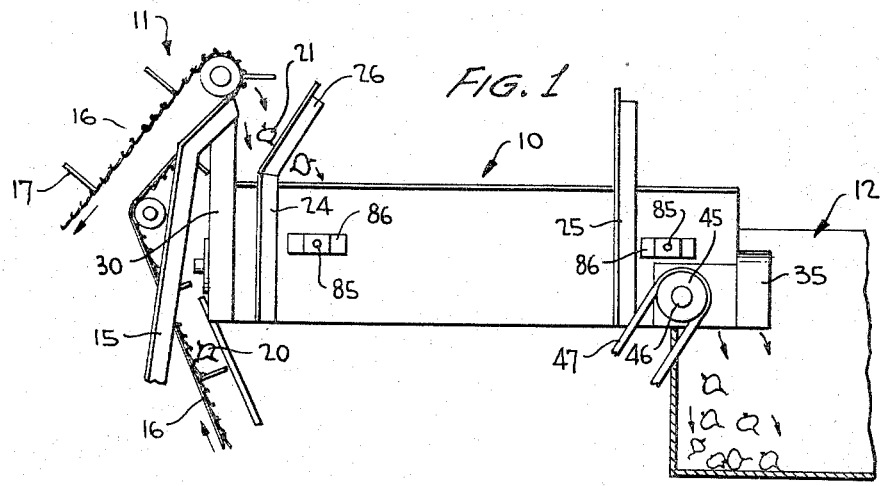
FIGURE 1 is a view in side elevation of a device embodying the principles of the invention, a feeding conveyor and a delivery bin or receptacle being shown rather diagrammatically.

The novel separating or screening device is designated by the general reference character 10 and is disposed in an approximately horizontal position between an elevated conveyor 11 and a receiving bin or hopper 12 as suggested in the somewhat diagrammatic showing in FIGURE 1. Although means for supplying the harvested crop to the separator may take many different forms, the suggestive installation comprising the elevator 11 may include a supporting frame shown fragmentarily at 15 and the conveyor chain 16 provided with the flights 17 for elevating the crop shown at 20 and discharging it as at 21 into the receiving end of the separator device 10.

The receiving bin or hopper 12 may be of any desired construction and supported at the discharge end of the device 10 in any suitable fashion.

The separator unit 10 itself comprises two substantially vertical side frame members 22 and 23 spaced apart transversely of the device and braced by means of the arched angle iron wickets 24 and 25. The wicket 24 has two parallel legs secured to the side frames 22 and 23 and its arched portion 26 is angled slightly forwardly to provide ready access of the crop and accompanying material to the separator.

A further arched brace is indicated at 30 at the intake end of the machine and this arch has a post 31 depending from its mid-portion and serving to support a cross yoke 32 and one end of a triangular longitudinal partition or divider structure indicated at 33.

At the delivery end of the device there is provided a transmission housing 35 secured to an end board 36 of the device 10. The end piece 36 not only provides support at the discharge end of the device for the central divider partition 33 but provides bearings for the ends of the shafts 38 and 39 of the rotary cylinders or rolls 40 and 41, the opposite ends of the shafts 38 and 39 being supported in bearings carried by the upturned ears of the yoke 32.

The rolls 40 and 41 are driven in opposite directions by means of the transmission shown very clearly in FIGURE 4 of the drawings. An external pulley 45 is mounted on a shaft 46 and is driven by a belt 47 from any suitable source of power, either that which drives the harvester itself or an independent drive. Internally of the sub-housing 48 the stub shaft 46 is provided with a bevel gear 49 which meshes with a bevel gear 50 carried upon the stub shaft 51 which carries a sprocket 52.

A sprocket wheel 55 is carried by the shaft 38 of the roll 40 and the sprocket 56 is fixed to the shaft 39 of the roll 41. Idler sprockets 57 and 58 are carried by fixed stub shafts in the transmission housing 35, and a pivoted idler sprocket 60 carried upon a lever 61 urged by a spring 62 is furnished to take up any slack in the drive chain 65 which connects the driven sprockets 55 and 56 with the power sprocket 52, all as clearly shown in FIGURE 4 of the drawings.

One of the principal features of novelty of the invention is comprised by the helical rods 70 and 71 which are wound respectively in opposite directions about the cylinders or rolls 40 and 41. These spiral bars or rods 70 and 71 are elevated from the surfaces of their cylinders as by means of the short posts 72. The winding of the helical rods or bars 70 and 71 are in opposite directions as clearly indicated in FIGURE 2 of the drawings and in such a way that, considering the outward overhand direction of rotation of the cylinders as indicated by the arrows A, the crop and accompanying materials will be moved in a generally longitudinal direction indicated by the arrows B, while at the same time moving the material outwardly toward the respective side walls of the device and away from the central triangular divider partition 33.

Adjacent each outer side of the rolls 40 and 41 and hingedly secured to the side walls 22 and 23 are the baffle plates 80 and 81. The hinges are indicated at 82 and may be supported by a ledge 83. The lower edges of the baffle plates 80 and 81 are contacted by the inner ends of the shafts or plungers 85, these plungers passing through openings in the side walls 22 and 23 and through openings through the brackets 86 secured to the outer faces of the respective side walls. In order to urge the plungers or rods 85 inwardly to back up the baffles 80 and 81, a pin 88 passes through an intermediate portion of the plunger 85 and backs up a washer 89 between which the end portion of the bracket 86 a coil spring 90 is compressed. If desired, in order to provide a smoother bearing surface between the edge of each baffle plate and the adjacent spiral bar of the cylinders, the edge may be provided with a rounded beading 92.

A practical embodiment of the invention having been illustrated and described, the use and operation of the device will now be set forth in exemplary form and applicable to the illustrated embodiment and many other equivalent structures.

Figure 2:
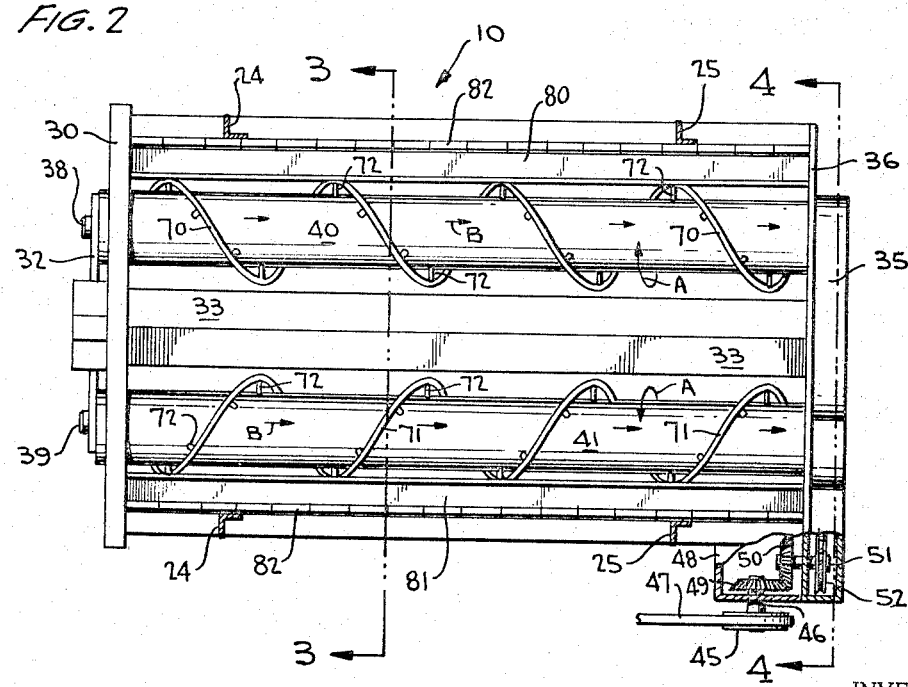
FIGURE 2 is a plan view of the device on a somewhat enlarged scale, minor portions being shown in section for clarity of disclosure.

The root crops such as beets or the like, together with the excavated accompanying debris including earth, sand, mud, clods, rocks, stones, and undesired vegetation, are delivered into the left-hand end of the device as seen in FIGURES 1 and 2 and are immediately caught and stirred or activated by the outwardly rotating cylinders or drums 40 and 41. Immediately some of the finer material, together with the bulk of the weeds and undesirable vegetation, will fall through the spaces between the cylinders or drums proper and the helical rods, on both the inner or partition sides of the cylinders and the outer sides thereof.

During this rotary feeding movement the lighter crop products such as the sugar beets mentioned, will float along the rolls or cylinders in the direction of the arrows B and the beets will thus be kept substantially free from the rolls or cylinders proper. Thus the beets or other crop will not be bruised, broken, or have the tail portions squeezed off nor the beets carried through the space between the cylinders and the baffles.

The raised spiral rods also keep the rolls or cylinders free from mud, the build-up of mud on the rolls being impossible due to the opposite rotation of the rolls or cylinders.

Now if larger stones, rocks, or hard clods are encountered and forced outwardly around the rolls by the helical rods or bars, when they encounter the edges of the spring-pressed baffles, the baffles will yield against the springs 90 and permit these hard larger lumps to pass through and be discharged.

Of course, the spacing of the rods above the surfaces of the cylinders may be varied somewhat in accordance with the type of crop to be treated and this will also dictate the speed of operation of the driving mechanism.

Also, some leeway as to the generally horizontal position of the device may be permitted, within the limits of tilt in either direction which would cause the force of gravity to interfere with the described desired forward and lateral movement of the material.

Although the use of two parallel cylinders, rolls, or drums of the novel type described is a quite economical manner of operation, it is understood that within the scope of the claims, a single cylinder or roll with its cooperating yieldable baffle plate may be employed, or on the other hand, three or more rolls may be provided in a larger machine.

Other changes and modifications may be made in the embodiment illustrated and described herein without departing from the scope of the invention as determined by the subjoined claims.

Having thus described the invention, what is claimed as new and desirable to be secured by Letters Patent is:

1. A device for separating root crops from debris accompanying the harvesting of such crops, whether such debris is light, heavy, hard, frangible, adherent, or of coarse or fine consistency; said device comprising a rotary cylinder disposed in an approximately horizontal plane, means for rotating said cylinder about its axis, a continuous bar wound in helical formation about said cylinder, and means at intervals along said cylinder for supporting said helically coiled bar in position spaced from the outer surface of said cylinder, the direction of winding of said helical bar and the direction of rotation of said cylinder being such as to tend to move material delivered onto said cylinder both longitudinally thereof and in a rotary direction toward which the upper portions of the cylinder are turning, means enclosing said wound cylinder on both lateral sides thereof; the last named means on the side of the cylinder toward which the upper portions of the cylinder turn, and thus the side toward which the material is moved, comprising a resiliently yieldable baffle plate subject to yielding upon the movement thereagainst of a large hard piece such as a rock; the helical rod serving to move the crop in a generally longitudinal direction along the device, and the finer debris falling from the device through the spaces between the surface of the cylinder and the wound helical rod; and a discharge space at one end of said device through which the relatively lighter weight crop units are delivered.

2. The device as set forth in claim 1 in which said yieldable baffle plate is hingedly mounted at its upper edge and spring means are provided for urging the lower edge thereof toward the periphery of the helical bar on the cylinder.

3. The device as set forth in claim 1 in which a pair of parallel wound cylinders of the construction set forth are provided within a single enclosure, the winding of the helical rods being in opposite hand, means for rotating said cylinders in opposite directions the upper portions thereof moving outwardly and tending to displace the material delivered upon the cylinders outwardly, a fixed partition member between the cylinders serving as a divider of the material supplied, and the yielding baffle plate for each cylinder disposed upon the outward sides thereof.

4. The device as set forth in claim 3 in which the central fixed partition is downwardly divergent from a longitudinal peak and the helical bars of the two cylinders are separated by the wider lower portion of said partition.

5. The device as set forth in claim 3 in which the enclosure comprises two substantially vertical fixed side walls, means bridging said side walls and providing support for said partition member and providing bearings for said cylinder, each of said fixed side walls being spaced from its adjacent wound cylinder and said yieldable baffle plate being hingedly supported from said fixed side walls.

6. The device as set forth in claim 5 in which the cylinder supporting means comprises a transmission housing connecting the fixed side walls at one end of the device and a suspended yoke at the opposite end thereof, and arched bracing wickets bridging over the enclosure and serving to additionally connect said fixed side frames.

References Cited

UNITED STATES PATENTS 788,618   5/1905   Widney _____ 209—101
3,283,895  11/1966  Rollins _____ 209—107

M. HENSON WOOD, Jr., *Primary Examiner.*

R. A. SCHACHER, *Assistant Examiner.*